(12) United States Patent
Huynh et al.

(10) Patent No.: US 9,421,926 B2
(45) Date of Patent: Aug. 23, 2016

(54) VEHICLE BUMPER PROTECTION DEVICE

(71) Applicants: Giang Huynh, Sacramento, CA (US);
Philip P. Nguyen, Sacramento, CA (US);
Mai H. Nguyen, Sacramento, CA (US);
Ben M. Le, Sacramento, CA (US)

(72) Inventors: Giang Huynh, Sacramento, CA (US);
Philip P. Nguyen, Sacramento, CA (US);
Mai H. Nguyen, Sacramento, CA (US);
Ben M. Le, Sacramento, CA (US)

( * ) Notice: Subject to any disclaimer, the term of this patent is extended or adjusted under 35 U.S.C. 154(b) by 4 days.

(21) Appl. No.: 14/478,092

(22) Filed: Sep. 5, 2014

(65) Prior Publication Data
US 2016/0068124 A1   Mar. 10, 2016

(51) Int. Cl.
*B60R 19/18* (2006.01)
*B60R 19/20* (2006.01)
*B60R 19/44* (2006.01)

(52) U.S. Cl.
CPC ............. *B60R 19/20* (2013.01); *B60R 19/18* (2013.01); *B60R 19/44* (2013.01); *B60R 2019/186* (2013.01)

(58) Field of Classification Search
CPC ........... A61H 2201/165; A61H 9/0092; A61H 9/0078; A61H 2209/00; A61F 13/085; H01L 2924/00; H01L 2924/00014; H01L 2224/48091; H01L 2224/48247; H01L 2224/48465

USPC ........................................................ 293/108
See application file for complete search history.

(56) References Cited

U.S. PATENT DOCUMENTS

| | | | | |
|---|---|---|---|---|
| 3,708,194 A | * | 1/1973 | Amit ................... | B60R 19/205 141/317 |
| 3,810,668 A | * | 5/1974 | Kornhauser ...... | B60R 21/26005 267/116 |
| 3,822,076 A | * | 7/1974 | Mercier ............... | B60R 19/205 180/274 |
| 3,938,840 A | * | 2/1976 | Haase .................. | F16F 9/049 188/298 |
| 4,176,858 A | * | 12/1979 | Kornhauser ........... | B60R 19/20 280/734 |

(Continued)

FOREIGN PATENT DOCUMENTS

CN    102019893 A    4/2011
CN    202368518 U    8/2012

*Primary Examiner* — Kiran B Patel

(57) ABSTRACT

A vehicle bumper protection device reduces the force of impact in the event of collision. The device includes a chamber having a top wall, a bottom wall, a first side wall, a second side wall, a front wall and a rear wall. The first and second side walls are coupled to and extend between the top and bottom walls and the front and rear walls. The chamber is configured for attaching to a vehicle bumper. An inflatable bladder is positioned in the chamber. A compression assembly is positioned within the bladder and is configured to absorb shock upon impact of the chamber.

12 Claims, 3 Drawing Sheets

(56) References Cited

U.S. PATENT DOCUMENTS

| | | | | |
|---|---|---|---|---|
| 4,995,659 A * | 2/1991 | Park | B60R 13/00 | 293/107 |
| 5,185,592 A * | 2/1993 | Hamilton | B60Q 9/003 | 200/61.44 |
| 5,358,001 A * | 10/1994 | Smith | F16K 15/202 | 137/223 |
| 5,431,463 A * | 7/1995 | Chou | B60R 19/20 | 293/110 |
| 5,646,613 A * | 7/1997 | Cho | B60R 19/38 | 180/167 |
| 5,725,265 A * | 3/1998 | Baber | B60R 19/205 | 280/728.3 |
| 5,725,266 A * | 3/1998 | Anderson | B60R 19/18 | 293/120 |
| 6,217,090 B1 * | 4/2001 | Berzinji | B60R 19/28 | 293/106 |
| 6,375,251 B1 * | 4/2002 | Taghaddos | B62D 21/15 | 296/187.03 |
| 6,497,183 B2 * | 12/2002 | Demarquilly | B60R 19/205 | 105/392.5 |
| 6,883,631 B2 * | 4/2005 | Hu | B60R 19/205 | 180/274 |
| 6,923,483 B2 * | 8/2005 | Curry | B60R 19/205 | 180/274 |
| 7,036,844 B2 * | 5/2006 | Hammer | B60R 19/205 | 280/729 |
| 7,070,030 B2 * | 7/2006 | Etcheverry | B60R 21/0428 | 188/371 |
| 7,097,222 B2 * | 8/2006 | Ran | B60R 19/28 | 293/102 |
| 7,222,897 B2 | 5/2007 | Evans et al. | | |
| 7,232,001 B2 * | 6/2007 | Hakki | B60R 19/205 | 180/271 |
| 7,258,191 B1 | 8/2007 | Rammer | | |
| 7,261,345 B2 * | 8/2007 | Akad | B60R 19/20 | 293/109 |
| 7,461,877 B2 | 12/2008 | Bailey | | |
| 7,753,159 B2 * | 7/2010 | Kim | B60R 21/0136 | 180/274 |
| 7,984,939 B2 | 7/2011 | Vodavoz | | |
| 8,376,451 B2 * | 2/2013 | Todd | B60J 5/042 | 296/187.02 |
| 8,439,411 B2 * | 5/2013 | Cave | B29C 65/342 | 293/102 |
| 8,672,078 B2 * | 3/2014 | Lee | B60R 19/205 | 180/271 |
| 8,840,171 B2 * | 9/2014 | Nagwanshi | B60R 19/18 | 296/187.08 |
| 9,205,792 B1 * | 12/2015 | Clark | B60R 19/205 | |
| 9,205,794 B1 * | 12/2015 | Farooq | B60R 21/0134 | |
| 2003/0020289 A1 * | 1/2003 | Dohrmann | B60R 19/205 | 293/107 |
| 2005/0230940 A1 * | 10/2005 | Alexander | B60R 21/2338 | 280/730.1 |
| 2006/0202492 A1 * | 9/2006 | Barvosa-Carter | B60N 2/42709 | 293/107 |

\* cited by examiner

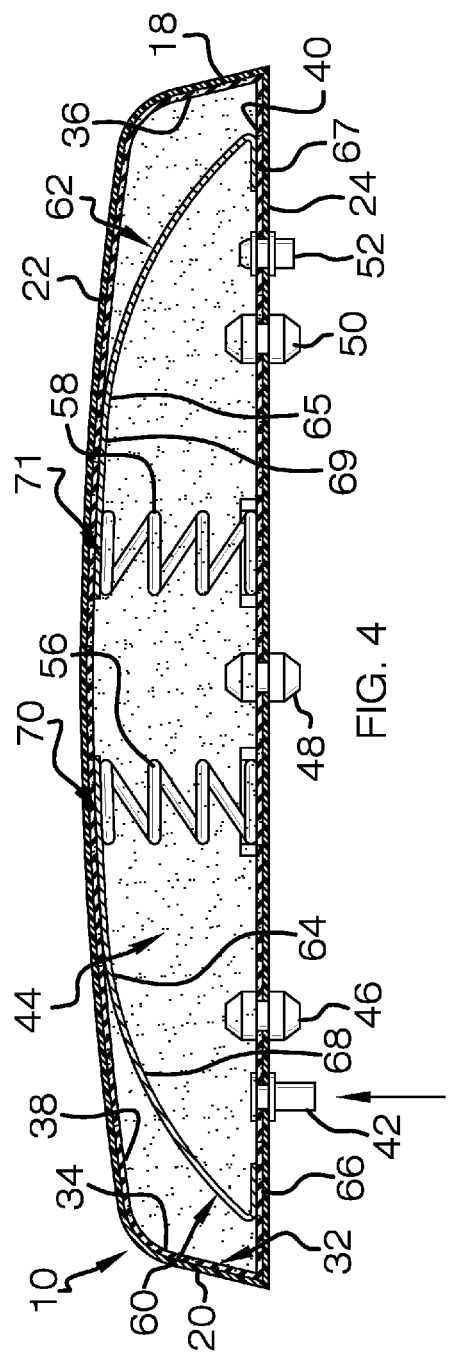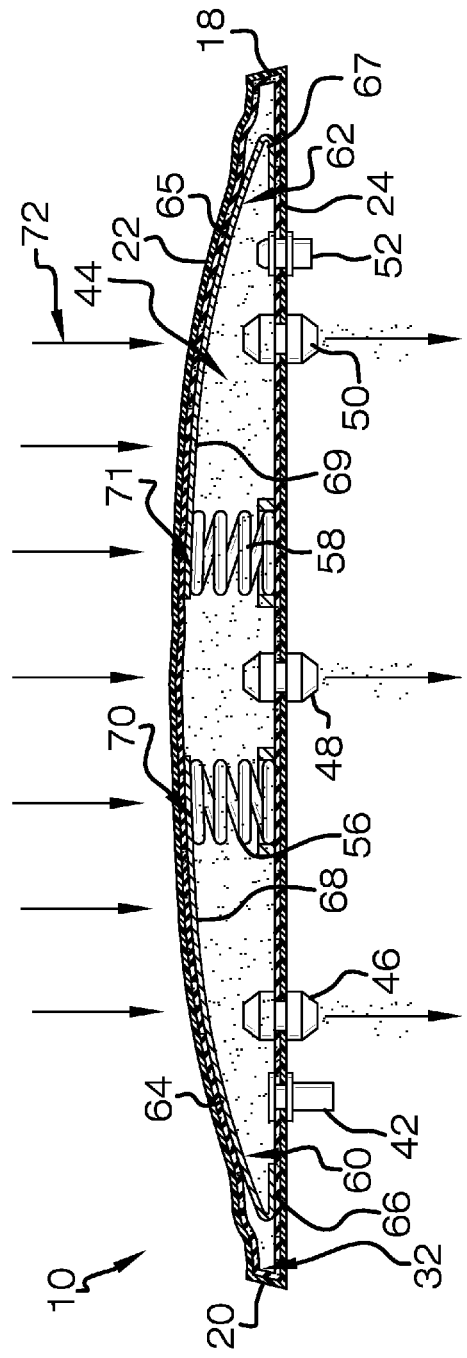

VEHICLE BUMPER PROTECTION DEVICE

BACKGROUND OF THE DISCLOSURE

Field of the Disclosure

The disclosure relates to vehicle protection devices and more particularly pertains to a new vehicle protection device for reducing the force of impact in the event of collision.

SUMMARY OF THE DISCLOSURE

An embodiment of the disclosure meets the needs presented above by generally comprising a chamber having a top wall, a bottom wall, a first side wall, a second side wall, a front wall and a rear wall. The first and second side walls are coupled to and extend between the top and bottom walls and the front and rear walls. The chamber is configured for attaching to a vehicle bumper. An inflatable bladder is positioned in the chamber. A compression assembly is positioned within the bladder and is configured to absorb shock upon impact of the chamber.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a cross-sectional view of an embodiment of the disclosure taken along line 4-4 of FIG. 2 showing the device in a normal, inflated state.

FIG. 5 is a cross-sectional view of an embodiment of the disclosure similar to FIG. 4, except that FIG. 5 shows the compression assembly in a compressed state due to impact forces from a collision.

DESCRIPTION OF THE PREFERRED EMBODIMENT

Figure 1:
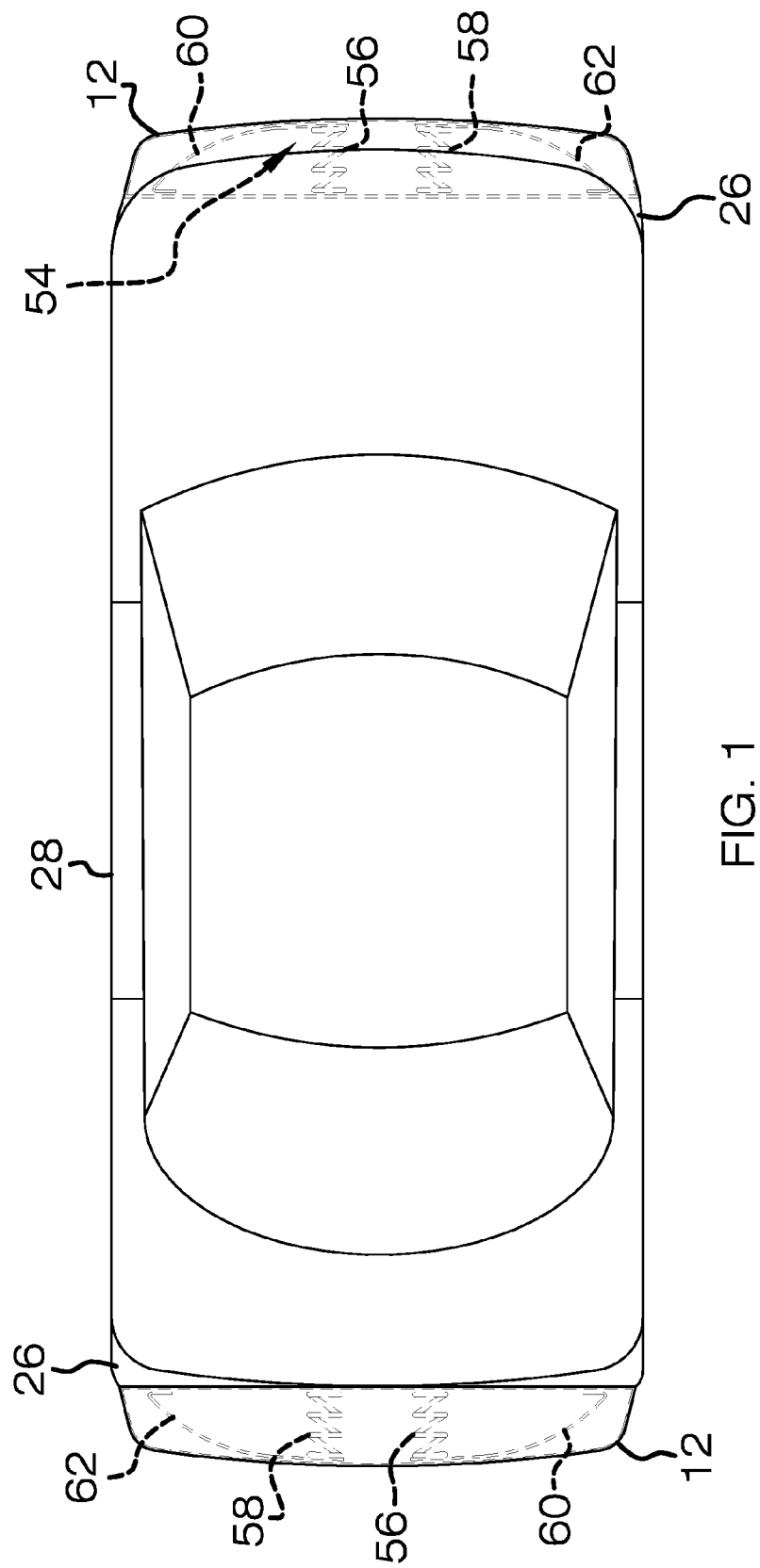
FIG. 1 is an in-use top view of a vehicle bumper protection device according to an embodiment of the disclosure.
Figure 2:
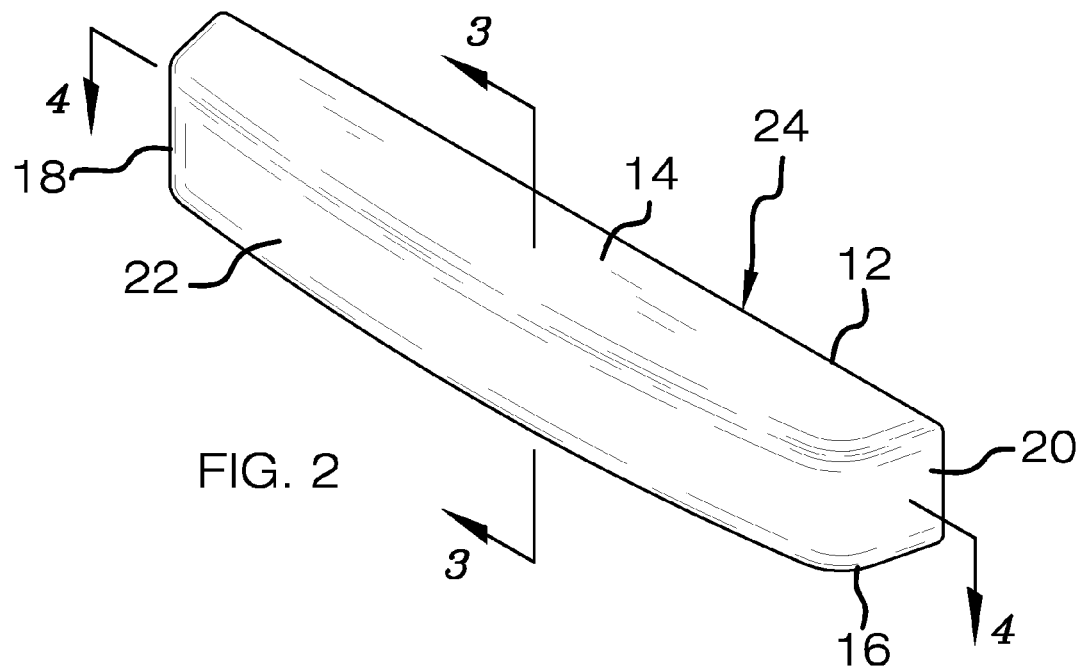
FIG. 2 is a top front side perspective view of an embodiment of the disclosure.
Figure 3:
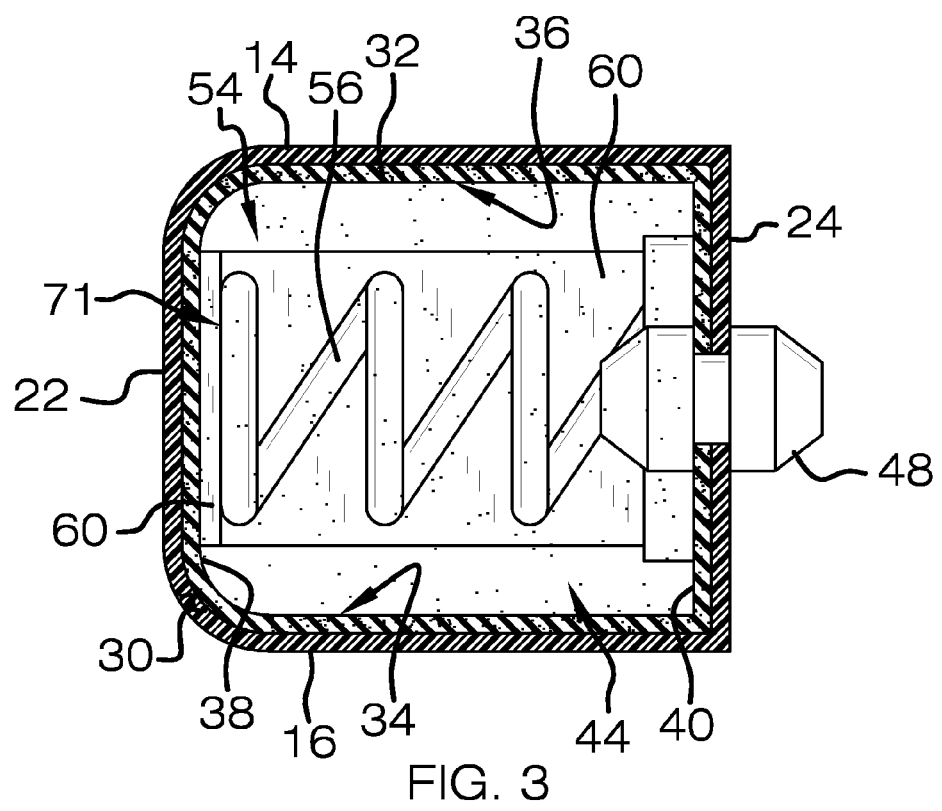
FIG. 3 is a cross-sectional view of an embodiment of the disclosure taken along line 3-3 of FIG. 2.

With reference now to the drawings, and in particular to FIGS. 1 through 5 thereof, a new vehicle protection device embodying the principles and concepts of an embodiment of the disclosure and generally designated by the reference numeral 10 will be described.

As best illustrated in FIGS. 1 through 5, the vehicle bumper protection device 10 generally comprises a chamber 12 having a top wall 14, a bottom wall 16, a first side wall 18, a second side wall 20, a front wall 22 and a rear wall 24. The first 18 and second 20 side walls are coupled to and extend between the top 14 and bottom 16 walls and the front 22 and rear 24 walls. The front wall 22 and each of the first 18 and second 20 side walls may be convexly arcuate. The chamber 12 is configured for attaching to a bumper 26 of a vehicle 28. In particular, two of the devices 10 may be provided with one attached to a front bumper and one attached to the rear bumper. The chamber 12 may be constructed from an elastomeric material 30, such as rubber.

An inflatable bladder 32 is positioned in and lines an interior of the chamber 12. The bladder 32 has a pair of lateral sides 34, 36 and a pair of longitudinal sides 38, 40 coupled to and extending between the pair of lateral sides 34, 36. An intake valve 42 is coupled to the chamber 12. The intake valve 42 is openable such that the bladder 32 is configured for fluidly coupling to an inflation mechanism 74 for releasing pressurized gas 44, such as air, from the inflation mechanism 74 into the bladder 32. As shown in FIG. 4, the inflation mechanism 74 may be an extrinsic pump 76 relative to the vehicle 28. Alternatively, as represented in FIG. 5, the inflation mechanism 74 may be a motorized pump 78 incorporated into the vehicle 28 and controlled by operational switches or the like within the vehicle 28.

At least one, and preferably a plurality of release valves 46, 48, 50 is coupled to the chamber 12. The release valves 46, 48, 50 are openable such that the bladder 32 is in fluid communication with an external environment relative to the chamber 12 wherein the release valves 46, 48, 50 are configured for releasing the presssurized gas 44 from the bladder 32 into the external environment. The release valves 46, 48, 50 are preferably one-way valves that allow the pressurized gas 44 to flow through it in only a single direction wherein the pressurized gas 44 flows outwardly of the bladder 32 and the chamber 12 to the external environment. A pressure sensor 52 is coupled to the chamber 12 and is configured to measure air pressure within the chamber 12 and provide an alert when the air pressure has fallen below a threshold level, for example, by activating an indicator light on the dashboard of the vehicle 28.

A compression assembly 54 is positioned within the bladder 32. The compression assembly 54 includes a plurality of biasing members 56, 58, 60, 62 for absorbing shock upon impact of the chamber 12. The biasing members 56, 58, 60, 62 include a plurality of helical coils 56, 58 and a pair of leaf springs 60, 62. Each helical coil 56, 58 extends between and abuts the longitudinal sides 38, 40 of the bladder 32. Similarly, each of the leaf springs 60, 62 extends between and abuts the longitudinal sides 38, 40 of the bladder 32. Each of the leaf springs 60, 62 has an arcuate portion 64, 65 attached to a straight portion 66, 67. Each of the arcuate portions 64, 65 has a respective inner surface 68, 69 abutting a first end 70, 71 of an associated one of the helical coils 56, 58 such that compression of the leaf springs 60, 62 causes compression of the helical coils 56, 58. Each of the leaf springs 60, 62 may be spaced from each other.

In use, as stated above and shown in the Figures, the device 10 is attached to a bumper 26 of a vehicle 28. The bladder 32 is inflated with a pressurized gas 44 to help prevent against injuries to the vehicle 28 and injuries to people riding within the vehicle 28. When an impact force 72 is exerted on the chamber 12, the biasing members 56, 58, 60, 62 compress to help absorb shock from the collision. The pressure sensor 52 measures air pressure within the chamber 12 and alerts a person when the pressure has fallen below a threshold level so that the bladder 32 can be re-filled with air as required. The bladder 32, being of an inflatable nature, may also help keep the vehicle 28 afloat within a body of water.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A vehicle bumper protection device comprising:
a chamber having a top wall, a bottom wall, a first side wall, a second side wall, a front wall and a rear wall, said first and second side walls being coupled to and extending between said top and bottom walls and said front and rear walls, said chamber being configured for attaching to a bumper of a vehicle;
a bladder being positioned in and lining an interior of said chamber, said bladder being inflatable, said bladder having a pair of lateral sides and a pair of longitudinal sides coupled to and extending between said pair of lateral sides; and
a compression assembly positioned within said bladder, said compression assembly being configured to absorb shock upon impact of said chamber.

2. The device of claim 1, further comprising an intake valve coupled to said chamber, said intake valve being openable such that said bladder is configured for fluidly coupling to an inflation mechanism for releasing the pressurized gas from the inflation mechanism into said bladder.

3. The device of claim 1, further comprising a release valve coupled to said chamber, said release valve being openable such that said bladder is in fluid communication with an external environment relative to said chamber wherein said release valve is configured for releasing the presssurized gas from said bladder to the external environment.

4. The device of claim 1, further comprising said compression system including a plurality of biasing members.

5. The device of claim 4, further comprising wherein at least one of said biasing members is a helical coil, each said helical coil extending between and abutting said longitudinal sides of said bladder.

6. The device of claim 4, further comprising wherein said plurality of biasing members includes a pair of leaf springs, each of said leaf springs extending between and abutting said longitudinal sides of said bladder, each of said leaf springs having an arcuate portion attached to a straight portion.

7. The device of claim 6, further comprising each of said leaf springs being spaced from each other.

8. The device of claim 6, further comprising wherein at least two of said biasing members is a helical coil, each said helical coil extending between and abutting said longitudinal sides of said bladder, each of said arcuate portions of said leaf springs having a respective inner surface abutting a first end of an associated one of said helical coils such that compression of said leaf springs causes compression of said helical coils.

9. The device of claim 1, further comprising said front wall being convexly arcuate.

10. The device of claim 1, further comprising each of said first and second side walls being convexly arcuate.

11. The device of claim 3, further comprising said release valve being one of a plurality of said release valves.

12. A vehicle bumper protection device comprising:
a chamber having a top wall, a bottom wall, a first side wall, a second side wall, a front wall and a rear wall, said first and second side walls being coupled to and extending between said top and bottom walls and said front and rear walls, said front wall and each of said first and second side walls being convexly arcuate, said chamber being configured for attaching to a bumper of a vehicle;
a bladder being positioned in and lining an interior of said chamber, said bladder being inflatable, said bladder having a pair of lateral sides and a pair of longitudinal sides coupled to and extending between said pair of lateral sides;
an intake valve coupled to said chamber, said intake valve being openable such that said bladder is configured for fluidly coupling to an inflation mechanism for releasing pressurized gas from the inflation mechanism into said bladder;
a release valve coupled to said chamber, said release valve being openable such that said bladder is in fluid communication with an external environment relative to said chamber wherein said release valve is configured for releasing the presssurized gas from said bladder to the external environment, said release valve being one of a plurality of said release valves; and
a compression assembly positioned within said bladder, said compression assembly being configured to absorb shock upon impact of said chamber, said compression assembly including a plurality of biasing members, said biasing members including a plurality of helical coils and a pair of leaf springs, each said helical coil extending between and abutting said longitudinal sides of said bladder, each of said leaf springs extending between and abutting said longitudinal sides of said bladder, each of said leaf springs having an arcuate portion attached to a straight portion, each of said arcuate portions having a respective inner surface abutting a first end of an associated one of said helical coils such that compression of said leaf springs causes compression of said helical coils, each of said leaf springs being spaced from each other.

* * * * *